Case B

Linus H. Williams' Coffee & Tea Pot

117228

PATENTED JUL 18 1871

Witnesses.
R. T. Campbell
J. N. Campbell

Inventor
L. H. Williams
by
Munn Lewis & L. Lawrence

UNITED STATES PATENT OFFICE.

LINUS H. WILLIAMS, OF CROMWELL, CONNECTICUT.

IMPROVEMENT IN CONSTRUCTION OF TEA AND COFFEE-POTS.

Specification forming part of Letters Patent No. 117,228, dated July 18, 1871.

*To all whom it may concern:*

Be it known that I, LINUS H. WILLIAMS, of Cromwell, in the county of Middlesex and State of Connecticut, have invented a new and Improved Coffee and Tea-Pot; and I do hereby declare that the following is a full, clear, and exact description thereof, reference being had to the accompanying drawing making a part of this specification, in which—

Figure 1:
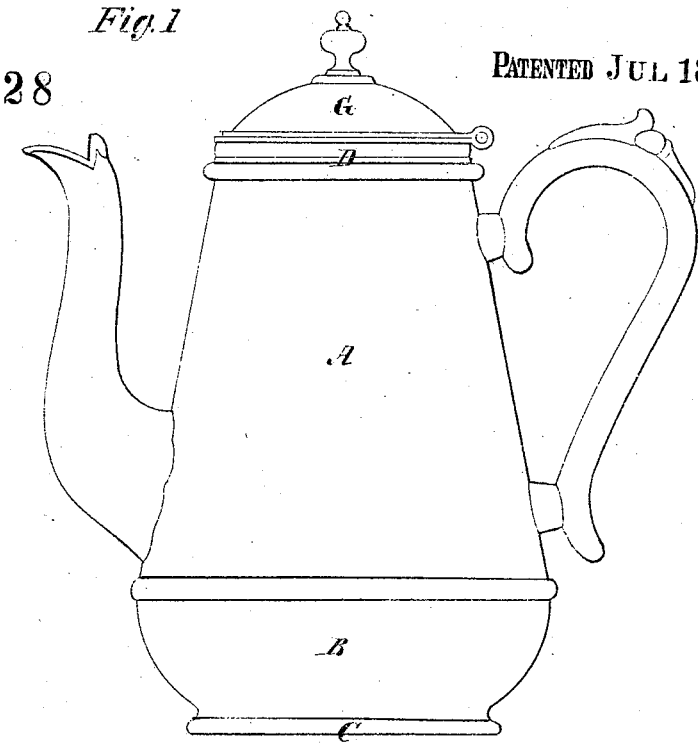
Figure 2:
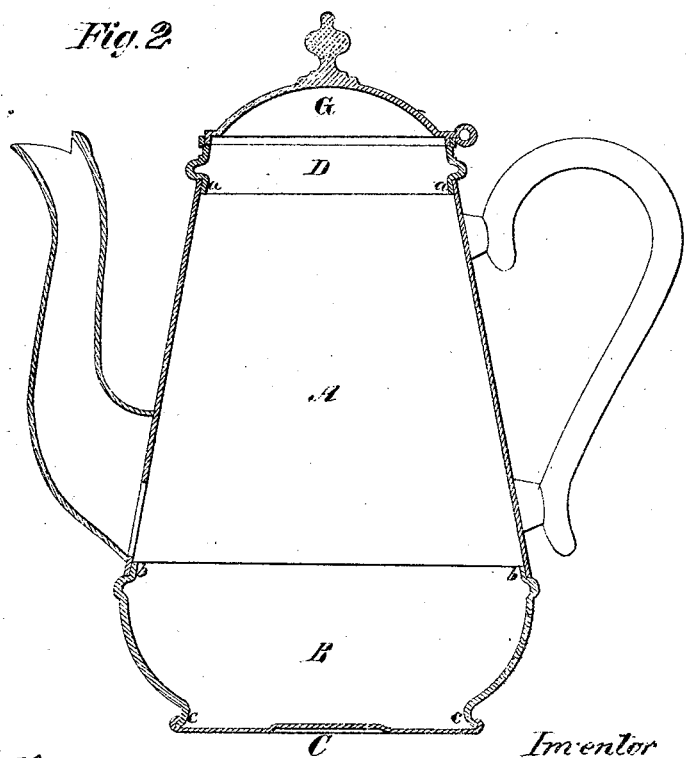

Figure 1 is a side view of the coffee and tea-pot. Fig. 2 is a diametrical section through the same.

Similar letters of reference inidcate corresponding parts in the two figures.

This invention relates to an improvement in the manufacture of coffee and tea-pots, wherein tinned iron or other readily oxidizable metal is employed in combination with cast white metal in the construction of the pots. The nature of my invention consists in a coffee or tea-pot having its upper capping-section made of cast white metal, its middle chamber-section made of tinned iron, and its lower chamber-section, which has the bottom connected to it, formed of cast white metal, the several parts of the pot being united by lap-joints so as to have the cast white-metal edges all come within the pot and the tinned-metal edges outside of the same.

The following description will enable others skilled in the art to understand my invention:

In the accompanying drawing, B, D, and G represent those parts of the pot which are made of a cast white metal, which will not readily rust or communicate a taint to the liquids put into the pot. A and C represent those portions of the pot which are made of tinned iron or tinned copper, or of some other suitable sheet metal which will readily oxidize if exposed to the fluids contained in the pot. The tinned-iron body A is of the form of the frustum of a cone, and has the handle and spout of the pot secured to it in any suitable manner. The cover-ring D and the rounded bottom portion B, which are made of cast metal, have lips and shoulders formed on them, as shown at *a b*, which respectively fit into the upper and lower ends of the body A and form lap-joints. This leaves the edges of the body A outside of said portions D and B, where they will not be exposed to the action of oxidizing fluids contained in the pot. The lower edge of the bottom portion B is turned outward and fitted into the upturned edges of the bottom C, which is preferably made of tinned copper. Here it will also be seen that the edges of the bottom plate C are on the outside of the cast metal B. The joints are finished by soldering them and thus uniting the sections together.

I am aware that it is not new to construct coffee and tea-pots with a tinned-iron body and a spun Britannia-metal bowl united together by a process of rolling wherein the lower edge of the tinned-iron body overlaps the Britannia-metal bowl by means of a rolled beaded joint.

I do not claim as my invention this kind of pot, as it is expensive and difficult to make; but, by my process of manufacture, the cover-ring D and bottom portion B are made by casting the metal and with lips and shoulders formed on them, as at *a* and *b*, so that the body portion A can readily be fitted thereon, as signified in Fig. 2, in which position the several parts are secured simply by soldering. In this way I am enabled to cheapen the construction of this class of coffee and tea-pots by about one-half its cost heretofore. I also am aware that a continuous one-part tinned-metal cylinder with a cast-iron flanged bottom plate is not new, and, therefore, I do not claim the same; but, What I do claim as my invention, and desire to secure by Letters Patent, is—

The cast white-metal chamber-section B, to which the tinned-copper or other analogous bottom C is connected, in combination with the tinned-metal-chamber section A, and the capping cast white-metal section D, all united by lap-joints, the inner edges of which are of cast white metal, all as and for the purpose therein described.

Witness my hand, in matter of my application for a patent for improved mode of constructing coffee and tea-pots, this 28th day of April, A. D. 1871.

LINUS H. WILLIAMS.

Witnesses:
J. N. CAMPBELL,
R. T. CAMPBELL.